United States Patent

[11] 3,631,268

| [72] | Inventor | David R. Matthews |
| | | Ann Arbor, Mich. |
| [21] | Appl. No. | 822,900 |
| [22] | Filed | May 8, 1969 |
| [45] | Patented | Dec. 28, 1971 |
| [73] | Assignee | Laser Systems Corporation |
| | | Ann Arbor, Mich. |

[54] PULSER FOR INTRUDER DETECTION SYSTEMS
3 Claims, 3 Drawing Figs.

[52] U.S. Cl. ................................................ 307/273,
307/288, 307/311
[51] Int. Cl. ................................................ H03k 3/10
[50] Field of Search ................................................ 307/288,
273

[56] References Cited
UNITED STATES PATENTS

| 2,837,663 | 6/1958 | Walz | 307/288 |
| 2,891,195 | 6/1959 | Smyth | 307/311 |
| 3,114,049 | 12/1963 | Blair | 307/308 |
| 3,171,978 | 3/1965 | Weber | 307/288 |
| 3,183,366 | 5/1965 | Brode | 307/288 |
| 3,534,351 | 10/1970 | Harnden | 307/311 |
| 2,916,636 | 12/1959 | Wanlass | 307/288 |
| 2,948,820 | 8/1960 | Bothwell | 307/288 |
| 2,976,432 | 3/1961 | Geckle | 307/273 |
| 2,995,706 | 8/1961 | Clarridee | 307/273 |
| 3,016,468 | 1/1962 | Moraff | 307/288 |
| 3,193,701 | 7/1965 | Lawhon | 307/288 |

*Primary Examiner*—Donald D. Forrer
*Assistant Examiner*—Harold A. Dixon
*Attorney*—McGlynn, Reising, Milton and Ethington

ABSTRACT: A multivibrator-type pulse forming circuit designed for asymmetric operation and power conservation. A current-controlling transistor is connected in series with one of the two complementary stages of the pulse-forming circuit to restrict current through the stage when the stage is conductive thereby to conserve power and to permit the use of a short time constant coupling circuit.

3,631,268

PULSER FOR INTRUDER DETECTION SYSTEMS

This invention relates to intruder detection systems and more particularly to an improved pulse forming circuit for use in the transmitter portion of such systems.

An intruder detection system generally comprises a signal transmitter and a signal receiver spaced apart along a common line of sight to define a monitored area. In one type, the transmitter emits optical signal pulses and maintains an alarm device in a deenergized state as long as the signals continue to be received. Should an intruder interrupt the transmission of pulses to the receiver, the absence of such pulses for a predetermined time interval causes the receiver to energize the alarm device. One such system is described in the copending application for patent U.S. Ser. No. 816,727 filed Apr. 16, 1969 in the name of David R. Matthews and entitled Intruder Detection System.

The implementation of the transmitter in such a system may include an emitting element such as a semiconductor diode and a pulse-forming device of the type having two complementally conductive stages, the emitting element being connected to the output of one of the stages. The use of a bistage circuit such as a multivibrator as the pulse-forming device presents at least two problems. First the multivibrator draws current not only through the stage loaded with the emitting element, but also through the other stage, thus wasting power and greatly shortening the period between maintenance of a battery-powered transmitter. This problem is aggravated where very short duration emitter pulses are used as the unloaded stage conducts for the major portion of the circuit's operating period. Secondly, a multivibrator generally includes capacitive timing circuits. Thus, where a short emitter pulse is required one of the timing capacitors must realize a charge reversal in a very short time constant is chosen to permit the rapid charge reversal, the current drain through the resistive portion of the charging circuit becomes excessive during the conductive period of the unloaded stage.

In accordance with the present invention, a transmitter for intruder detection systems is provided with a pulse-forming circuit which both conserves power and permits asymmetric operation for the production of short duration output pulses. In general, this is accomplished through the use of an emitting element, a pulse forming circuit having first and second complementally conductive stages, means connecting one of the stages to the emitting element to control the energization of the element and current controlling means connected to control the current flow from a power supply to the other stage and controlled by the one stage to restrict current flow through the other stage in accordance with the operating cycle of the pulse forming circuit.

In a specific embodiment of the invention, the pulse forming circuit may comprise a cross coupled multivibrator employing transistor stages of like conductivity type together with current-restricting transistor of opposite conductivity type connected between the power supply and a first stage and controlled by the other stage to restrict the flow of current through the first stage to that drawn by one of the cross coupled timing circuits.

The invention also provides an amplifier circuit having two complementally conductive stages for use wherever power conservation with asymmetric loading is a desired objective. Such an amplifier circuit is of general applicability but is particularly useful where the stage operating the output load is to conduct for a relatively short portion of the overall circuit period. The amplifier circuit readily admits of current amplitude regulation in the output stage with minimal circuit modification.

The various features and advantages of the invention will become apparent from a reading of the following specification which describes a specific embodiment and application of the invention. This description is to be taken with the accompanying drawings of which:

Figure 1:
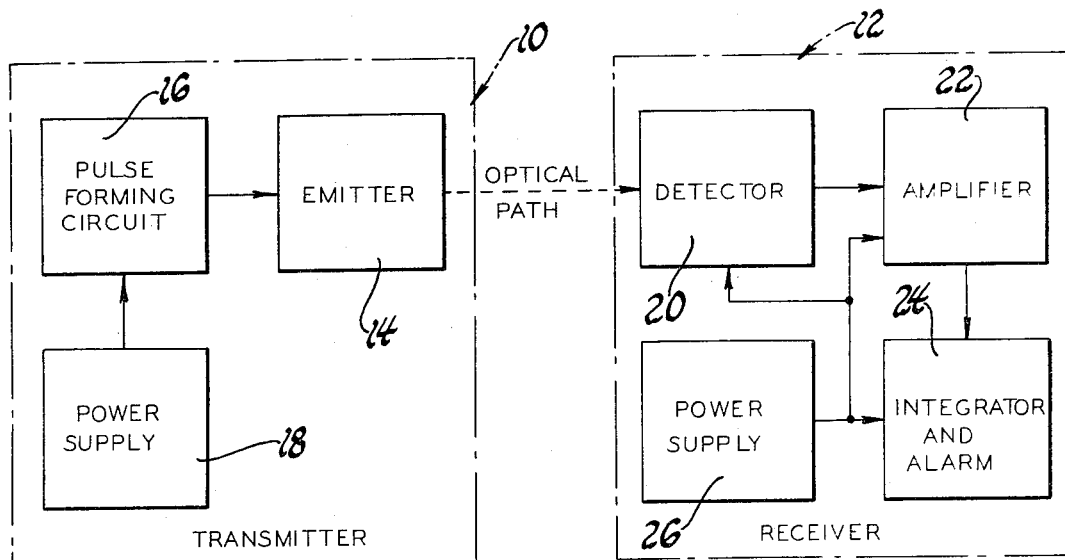
FIG. 1 is a block diagram of an intruder detection system of the type with which the invention is advantageously combined.

Referring now to FIG. 1, an intruder detection system of the pulse modulated electrooptical type is shown to include a transmitter 10 for producing optical signal pulses and a receiver 12 for receiving the pulses and controlling the generation of an alarm signal. Receiver 12 is spaced from the transmitter 10 along a line of sight defined by the "optical path" indicated in FIG. 1.

Transmitter 10 comprises an emitting element 14 such as a gallium arsenide diode of either the lasing or nonlasing type. The emitting element 14 is supplied with current pulses from a pulse-forming circuit 16 which is connected to a power supply 18. Power supply 18 may take the form of a DC voltage-producing battery.

Receiver 12 comprises an optical detector 20, such as a silicon diode, which is suitably aligned to receive the signals from transmitter 10 and to produce electrical signal pulses upon receipt thereof. Detector 20 is connected to an amplifier circuit 22 which increases the amplitude of the received pulses and supplies the amplified pulses to an integrator and alarm circuit 24. Circuit 24 may be implemented such that the alarm signal is rendered inactive as long as pulses of the proper form are received by detector 20 at a predetermined rate; however, in the absence of such signals for a predetermined period the integrator energizes the alarm to indicate the presence of an intruder in the optical path. Detector 20, amplifier 22, and integrator and alarm circuit 24 may be connected to a suitable DC power supply 26, such as a battery.

Figure 2:
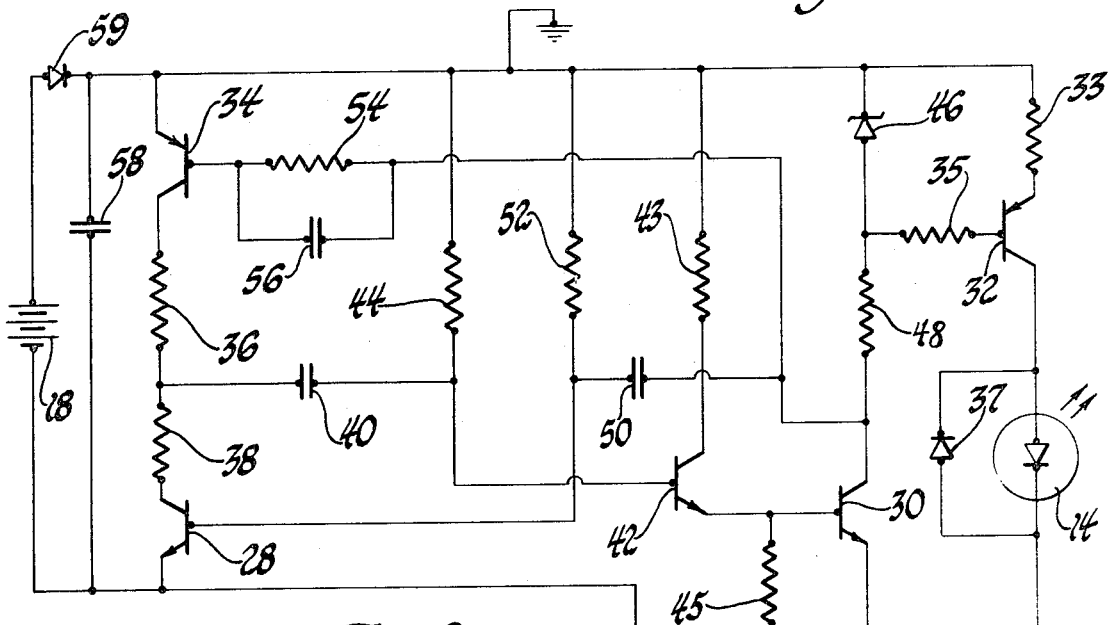
FIG. 2 is a schematic diagram of a pulse forming circuit employing the invention; and, FIG. 3 is a plot of the output voltage characteristic of the circuit of FIG. 2.

Referring to FIG. 2 the pulse-forming circuit 16 of FIG. 1 is shown in schematic detail. The circuit 16 comprises a multivibrator-type amplifier circuit having first and second complementally conductive stages defined by transistors 28 and 30, each transistor being of the NPN-type. Transistors 28 and 30 are cross coupled in a manner to be described whereby the pulse-forming circuit 16 operates in a free-running mode to supply current pulses to the diode emitting element 14 through an output-amplifying transistor 32 of the PNP-type. Power is supplied to the pulse-forming circuit 16 from the DC power supply 18. A current-controlling transistor 34 of the PNP-type has the emitter-collector circuit thereof connected in series with the collector-emitter circuit of transistor 28 through the series connected current limiting or loading resistors 36 and 38. The conductivity of transistor 34 is controlled by the collector voltage on transistor 30 to restrict the flow of current through the resistor 36 whenever transistor 28 is rendered conductive.

The switching function of the pulse forming circuit 16 is accomplished by means of cross-coupled capacitive timing circuits. The collector of transistor 28 is coupled to the base electrode of transistor 30 through the series circuit defined by the resistor 38, coupling capacitor 40 and the base to emitter circuit of an NPN-current amplifying transistor 42. The use of transistor 42 permits an increase in the value of resistor 44 and a decrease in the size of capacitor 40 to preserve the time constant of the circuit comprising these components. The collector of transistor 42 is connected to the positive terminal of the power supply 18 through the resistor 43 which limits the base current to transistor 30. A resistor 44 is connected between ground and the base electrode to transistor 42. Accordingly, the timing circuit which determines the conductive interval of transistor 28 includes the series combination of resistor 44, capacitor 40, resistor 38, and the collector emitter circuit of transistor 28. A resistor 45 is connected between the base and emitter of transistor 30 to speed up the turnoff time thereof. Similarly the collector of transistor 30 is coupled through capacitor 50 to the base or input electrode of transistor 28. A resistor 52 is connected between ground and the base of transistor 28 such that a timing circuit which determines the conductive interval of transistor 30 includes the series combination of resistor 52, capacitor 50, and the collector-emitter circuit of transistor 30. Current from source 18 is directed through a Zener diode 46, which regulates the bias applied to transistor 32, and a series loading resistor 48. In addition a resistor 35 is connected in series with the base of transistor 32 to eliminate ringing in the current pulse to diode 14 during switching of transistor 32. A diode 37 may be connected in shunt relation with diode 14 if the wires connecting diode 14 to transistor 32 become long so as to introduce a reactive circuit component.

The output transistor 32 receives current from power supply 18 through an emitter resistor 33. Accordingly, when transistor 30 is conductive, the decreased collector voltage drives transistor 32 conductive to permit the flow of a current pulse from power supply 18 through resistor 33 to the diode emitting element 14. The diode 14 produces an optical output signal in the infrared range when energized with a current pulse from power supply 18. Zener diode 46 may be shunted with an additional resistor to maintain close current regulation should the potential of power supply 18 become low. A large capacitor 58 is connected across the power supply 18 to filter any rapid voltage variations which may occur. In addition a diode 59 may be connected in series with power supply 18 to prevent circuit damage if the supply is improperly connected.

The collector electrode of transistor 30 is also coupled through a resistor 54 to the base electrode of the current controlling transistor 34. A capacitor 56 is connected in shunt relation with resistor 54 to speed up the switching time of transistor 34. The capacitor 56 may be eliminated where resistor 54 is small. Since transistors 30 and 34 are of opposite conductivity type, the above-described collector-to-base-coupling circuit causes transistors 30 and 34 to operate in a substantially synchronous fashion wherein both transistors are conductive and nonconductive at substantially the same time.

OPERATION

Figure 3:
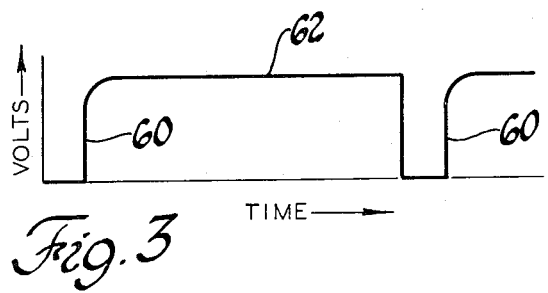

The operation of the circuit of FIG. 2 will now be described with reference to the wave form diagram of FIG. 3. As in a conventional multivibrator, transistors 28 and 30 are alternately switched to opposite conductivity states in complementary fashion by means of the cross coupled timing circuits including capacitors 40 and 50. Assuming power is applied to the circuit 16 and transistor 30 becomes conductive, capacitor 50 receives charging current through resistor 52 and the collector-to-emitter circuit of transistor 30. The decreasing collector voltage of transistor 30 forward biases current-limiting transistor 34 such that a transient current flows through resistor 36 and capacitor 40 to the base of transistor 42, tending to increase the forward bias on transistors 42 and 30. The decreased collector voltage of transistor 30 also forward biases transistor 32 causing current to flow through diode emitting element 14 as indicated by pulse 60 in FIG. 3.

Capacitor 50 continues to charge until transistor 28 is forward biased and begins to conduct. The resistor 52 and capacitor 50 are selected to exhibit a very short RC time constant so that pulses 60 are of short duration. As transistor 28 begins to conduct, the negative going collector voltage is applied to the base of transistor 42 tending to cut both transistors 42 and 30 off. Consequently, as the collector electrode of transistor 30 swings positive, this voltage swing is transmitted through capacitor 50 to the base of transistor 28 tending to drive the transistor further into saturation. Since transistors 32 and 34 are of the PNP-type, the positive going signal on the collector of transistor 30 also tends to cut transistors 32 and 34 off. The voltage across diode emitting element 14 rises to level 62 of FIG. 3.

With transistor 28 conductive, capacitor 40 will receive charging current in the reverse direction through the series combination of resistor 44, resistor 38, and the collector-to-emitter circuit of transistor 28. When the charge on capacitor 40 reaches a sufficiently positive voltage level, transistor 42 is again driven into saturation, thus, causing transistor 30 to conduct and reversing the conductive states of the complementary transistors 28 and 30. The time constant of resistor 44, capacitor 40 and resistor 38 is relatively long so that the duration of level 62 is great compared to that of pulse level 60. Therefore, transistor 28 is conductive for a longer interval than that of transistor 30 and, in a conventional multivibrator circuit, this would result in a large current drain on power supply 18. However, in the circuit of FIG. 2, transistor 34 is rendered nonconductive when transistor 28 is rendered conductive and current through transistor 28 is restricted to the path through resistor 44, which is of relatively large value. Therefore, the current drain on supply 18 is greatly reduced. It is to be noted that with transistor 28 conductive, capacitor 40 charges through resistors 44 and 38 for the relatively long interval 62 whereas, with transistor 30 conductive, capacitor 40 charges in the reverse direction through resistor 36 for the relatively short interval of pulses 60. If the charge reversal is not completed, the current through resistor 44 to the base of transistor 42 would be large enough that the positive voltage developed on capacitor 50 and applied to the base of transistor 28 might not reliably initiate the switching action. Therefore, to provide the short duration pulses 60, the time constant of resistor 36 and capacitor 40 must be very short. This can be accomplished by making resistor 36 very small and, in fact, smaller than resistor 44 by the ratio of the width of pulse 60 to the total period of the cycle represented in FIG. 3. Making resistor 36 very small would, in the conventional multivibrator, result in a heavy current drain through resistor 36 and transistor 28 when that transistor is conductive. Accordingly, the power loses for a conventional multivibrator circuit would deplete the power supply 18 relatively rapidly. However, with transistor 34 operating in a current limiting mode and controlled by the voltage on the collector of transistor 30, current through the series path comprising the emitter-to-collector circuit of transistor 34, the resistors 36 and 38 and the transistor 28 is severely limited, thus, preventing the excessive power drain while preserving the complementary action of the pulse forming circuit 16.

As previously described, output transistor 32 follows the conductive state of transistor 30. Accordingly, with transistor 30 conductive the low collector voltage is applied to the base electrode of transistor 32 rendering that transistor conductive. Current flows through resistor 33 to the emitting diode 14 which produces the optical output pulse of infrared energy. Current amplitude regulation through transistor 32 is accomplished by means of the Zener diode 46 which places a fixed base bias on transistor 32 during the conductive state of transistor 30. Accordingly, current pulses of well-regulated amplitude are applied to the emitting diode 14 resulting in the production of optical output pulses of precisely controlled characteristic.

In a specific embodiment, the circuit of FIG. 2 has been found suitable for producing current pulses 60 through diode 14 of approximately 50 microseconds duration and an interval 62 between such pulses of approximately 6 miliseconds. Other pulse periods and timing intervals may be obtained by suitable selection of component values.

It is to be understood that various modifications may be made to the specific embodiment described herein. For example, the capacitive timing circuit including capacitor 50 and resistor 52 may be eliminated and an external pulse generator be connected to the base of transistor 28 to control the overall period of the pulse forming circuit 16. Further, it may be desirable in various applications to eliminate the current gain stage represented by transistor 42 or, conversely, to add another such stage. In addition, various load devices may be substituted for the emitting diode 14 and accordingly, the foregoing description is not to be construed in a limiting sense.

The embodiments of the invention in which an exclusive property or privilege is claimed are defined as follows:

1. A radiant energy pulse transmitter comprising: a power supply, a radiant energy-emitting element energizable with current pulses to produce an output signal, an astable multivibrator-type pulse forming circuit having first and second complementarly conductive stages, means connecting the second stage to the emitting element to control the energization of the element in accordance with the conductivity of the second stage, selectively operable variable impedance current-controlling means connected in series with the first stage, the controlling means normally having a relatively low impedance, but being operated by the second stage to acquire a high-impedance state to restrict the flow of current through the first stage substantially only when the second stage is nonconductive, first and second capacitive timing circuits crossconnected between the first and second stages to provide a complemental conductivity operating characteristic, the first timing circuit having a substantially longer time constant than the second timing circuit whereby the first stage conducts for a substantially longer interval than the second stage, each of the first and second stages including a transistor having input and output electrodes, first and second loading impedances for connecting the power supply to an output electrode of each of the first and second transistors, respectively, said current controlling means comprising a transistor having output electrodes connected in series with the first loading impedance and an input electrode connected to an output electrode of the second stage transistor to restrict current flow in this first stage whenever the second stage transistor is nonconductive, each of the capacitive timing circuits comprising a capacitor connected between an output electrode of one stage transistor and an input of the other stage transistor and a resistor connected between the power supply and said input of the other stage transistor to permit charging of the capacitor through the series combination of the resistor and the associated stage transistor when conductive.

2. An astable multivibrator-type amplifier having first and second complementally conductive stages each having a control electrode and a pair of primary electrodes, first and second RC timing circuits cross-coupled between respective first and second stages to determine the conducting periods of the stages, one of the circuits including a capacitor connected between the control electrode of the second stage and a primary electrode of the first stage and having a substantially longer time constant than the other of the timing circuits whereby the conducting period of the first stage is substantially long relative to the conducting period of the second stage, a power supply, a third current-controlling stage having a pair of primary electrodes and a control electrode, the primary electrode as being connected in series with the power supply and the first stage, the control electrode being connected to the second stage whereby the third stage is conductive and nonconductive with the second stage, and a low-resistance circuit element connecting the primary electrodes of the third stage in series with the capacitor and the source for providing a low-resistance, high-speed charging path for the capacitor in said one timing circuit when the first stage is nonconductive.

3. An astable multivibrator circuit having first and second complementary conductive amplifier stages, each having an input and an output; a power supply; first and second loading impedances connected between the power supply and the first and second stages, respectively; first and second capacitive timing circuits cross connected between the power supply and inputs and outputs of the amplifier stages to provide the complemental conductivity, the first timing circuit having a longer time constant than the second timing circuit to provide an asymmetric amplifier output characteristic wherein the first stage conducts for a longer interval than the second stage; a current control element having a pair of output electrodes connected in series with the first loading impedance and an input electrode connected to the output of the second amplifier stage to restrict current flow across the output electrodes when the second stage is nonconductive thereby to limit the power drawn by the multivibrator circuit from the power supply, a load device, means including a current regulator for regulating the amplitude of current supplied to the load device and connecting the power supply to the load device through the second amplifier stage to energize the load when the second stage is conductive, each of said first and second stages comprising a transistor of first conductivity type and having input and output electrodes, the output electrodes being connected in series with the respective loading impedances, the first timing circuit comprising a first capacitor connected between an output electrode of the first stage transistor and an input of the second stage transistor and a resistor connected between the power supply and the input of the second stage transistor to direct current from the power supply through the first capacitor when the first stage transistor is conductive, the second timing circuit comprises a second capacitor connected between an output of the second stage transistor and an input of the first stage transistor and a resistor connected between the power supply and the input of the first stage transistor to direct current through the second capacitor when the first stage transistor is conductive, and the current control element is a transistor of a second conductivity type.

* * * * *